(12) United States Patent
Hardy et al.

(10) Patent No.: US 8,745,140 B2
(45) Date of Patent: Jun. 3, 2014

(54) SYSTEM AND METHOD OF HANDLING MESSAGES FOR FORWARDING

(75) Inventors: Michael Thomas Hardy, Waterloo (CA); Robin Roy Glennie, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1518 days.

(21) Appl. No.: 11/249,507

(22) Filed: Oct. 14, 2005

(65) Prior Publication Data
US 2007/0088787 A1    Apr. 19, 2007

(51) Int. Cl.
| | |
|---|---|
| *G06F 15/16* | (2006.01) |
| *G06F 3/00* | (2006.01) |
| *H04L 12/58* | (2006.01) |
| *H04M 1/725* | (2006.01) |
| *G06F 9/54* | (2006.01) |

(52) U.S. Cl.
CPC .............. *H04L 51/14* (2013.01); *H04L 12/58* (2013.01); *H04M 1/72552* (2013.01); *G06F 9/542* (2013.01); *H04L 12/5855* (2013.01)
USPC ............................ 709/206; 709/219; 719/313

(58) Field of Classification Search
CPC ..... H04L 51/14; H04L 12/58; H04L 12/5855; H04M 1/72552; G06F 9/542
USPC .................. 709/206, 219; 455/466; 719/313
See application file for complete search history.

(56) References Cited

U.S. PATENT DOCUMENTS

| | | | | |
|---|---|---|---|---|
| 5,119,475 A | * | 6/1992 | Smith et al. .................. 715/866 |
| 5,590,334 A | * | 12/1996 | Saulpaugh et al. ........... 719/315 |
| 5,946,629 A | * | 8/1999 | Sawyer et al. ................. 455/466 |
| 5,951,623 A | * | 9/1999 | Reynar et al. ................. 708/203 |
| 5,974,449 A | * | 10/1999 | Chang et al. ................... 709/206 |
| 6,081,832 A | * | 6/2000 | Gilchrist et al. .............. 709/206 |
| 6,151,507 A | | 11/2000 | Laiho et al. |
| 6,421,707 B1 | * | 7/2002 | Miller et al. ................... 709/206 |
| 6,424,828 B1 | * | 7/2002 | Collins et al. ............... 455/412.1 |
| 6,651,042 B1 | * | 11/2003 | Field et al. ..................... 704/270 |

(Continued)

FOREIGN PATENT DOCUMENTS

| | | |
|---|---|---|
| EP | 1 037 451 | 9/2000 |
| EP | 1 322 126 | 6/2003 |

(Continued)

OTHER PUBLICATIONS

Biemans M C M et al, "User evaluations to guide the design of an extended personal service environment for mobile services" 2001, USA, IEEE, Oct. 8, 2001, pp. 94-101.

(Continued)

*Primary Examiner* — Viet Vu
*Assistant Examiner* — Herman Belcher

(57) ABSTRACT

A message received, over a first message handling service, on a mobile wireless communication device may be forwarded using a second message handling service. When a user wishes to forward a received message object associated with a first message handling service, the user may be provided, by a new verb object, with the option to forward the received message object as a new message object associated with a second message handling service. In the event that the user exercises the option, the new verb object selects a previously existing verb object for generating the new message object. The new verb object then passes the received message object to the previously existing verb object.

19 Claims, 11 Drawing Sheets

(56) References Cited

U.S. PATENT DOCUMENTS

| | | |
|---|---|---|
| 7,191,449 B2 * | 3/2007 | Burgess ............... 719/313 |
| 7,269,431 B1 * | 9/2007 | Gilbert ............... 455/466 |
| 7,447,232 B2 * | 11/2008 | Stephens et al. ........... 370/471 |
| 2002/0112014 A1 * | 8/2002 | Bennett et al. ............ 709/206 |
| 2002/0133554 A1 * | 9/2002 | Checkoway et al. ......... 709/206 |
| 2002/0137530 A1 | 9/2002 | Karve |
| 2004/0006600 A1 * | 1/2004 | Miller et al. ............. 709/206 |
| 2004/0057403 A1 | 3/2004 | Jerbi et al. |
| 2004/0137884 A1 * | 7/2004 | Engstrom et al. .......... 455/414.1 |
| 2006/0009243 A1 * | 1/2006 | Dahan et al. ............. 455/466 |
| 2006/0031778 A1 * | 2/2006 | Goodwin et al. ........... 715/781 |
| 2006/0052119 A1 * | 3/2006 | Veen et al. .............. 455/466 |
| 2006/0053379 A1 * | 3/2006 | Henderson et al. ......... 715/751 |
| 2006/0245555 A1 * | 11/2006 | Makela ................ 379/88.12 |
| 2006/0276208 A1 * | 12/2006 | Jain ................... 455/466 |
| 2008/0278740 A1 * | 11/2008 | Bird et al. .............. 358/1.15 |
| 2008/0313282 A1 * | 12/2008 | Warila et al. ............ 709/206 |

FOREIGN PATENT DOCUMENTS

| | | | |
|---|---|---|---|
| EP | 1322126 A1 * | 6/2003 | ............ H04Q 7/22 |
| EP | 1 583 301 A1 | 3/2004 | |
| WO | WO 9912364 A2 * | 3/1999 | ............ H04Q 7/22 |
| WO | WO 02/07379 A2 | 1/2002 | |
| WO | WO 2004/066648 A1 | 8/2004 | |
| WO | WO 2004/086701 | 10/2004 | |
| WO | WO 2005/067435 A2 | 7/2005 | |

OTHER PUBLICATIONS http://web.archive.org/web/20001205184400/http://shoutmailcom/.

Mehdi Ghayour, Canadian Intellectual Property Office communication, dated Dec. 17, 2010, issued in relation to Application No. 2,623,323.

* cited by examiner

To: johnq@public.com ← 1110
Subject: Yesterday's ← 1102

From: (416)555-2424 ← 1104
Received: 2005-Oct-05 14:29 EDT ← 1106

Yesterday's teleconference
Hi Bob,

Further to yesterday's teleconference, I would like to set up a meeting with you and John to go over the final figures befo ← 1108

SYSTEM AND METHOD OF HANDLING MESSAGES FOR FORWARDING

FIELD OF THE INVENTION

The present application relates to electronic messaging and, in particular, the handling of a message received on a first message handling service for forwarding on a second message handling service.

BACKGROUND

Current mobile wireless communication devices provide features beyond basic wireless telephony that include an ability to send and receive Short Message Service (SMS) messages, an ability to send and receive e-mail messages and an ability to browse online information formatted using either the known Wireless Application Protocol (WAP) or the known Hyper-Text Transfer Protocol (HTML).

Each of the features is typically implemented in a separate client application executed on the wireless communication device. To implement the features outlined above as examples, an exemplary wireless communication device may require an SMS client application, an e-mail client application, a WAP browsing application and an HTML browsing application.

Unfortunately, when a user of the exemplary wireless communication device is intent on forwarding an SMS message to a recipient associated with an e-mail address, the user is required to copy, to a temporary memory (i.e., a "clipboard"), the payload of the SMS message while using the SMS client application to review the SMS message. The user is then required to exit the SMS client application and initialize the e-mail client application. While in the e-mail client application, the user may then take steps to edit a new outgoing e-mail message. Responsively, the e-mail client application may present a user interface screen with various editboxes corresponding to fields of a standard e-mail message. Such fields including a field for indicating a recipient, a field for indicating a subject and a field for the body of the e-mail message. The user may then paste the previously copied payload of the SMS message into the editbox of the user interface screen, which editbox corresponds to the body field of the new outgoing e-mail message, specify a subject and a recipient and then direct the e-mail client application to send the new outgoing message.

Such a set of actions may not be considered intuitive to the user and may be found to be tedious and time consuming.

BRIEF DESCRIPTION OF THE DRAWINGS

In the figures which illustrate example embodiments of this application:

FIG. 11 illustrates an exemplary e-mail message composition screen resulting from the selection of the e-mail option in the dialog of FIG. 10.

DETAILED DESCRIPTION

Figure 1:
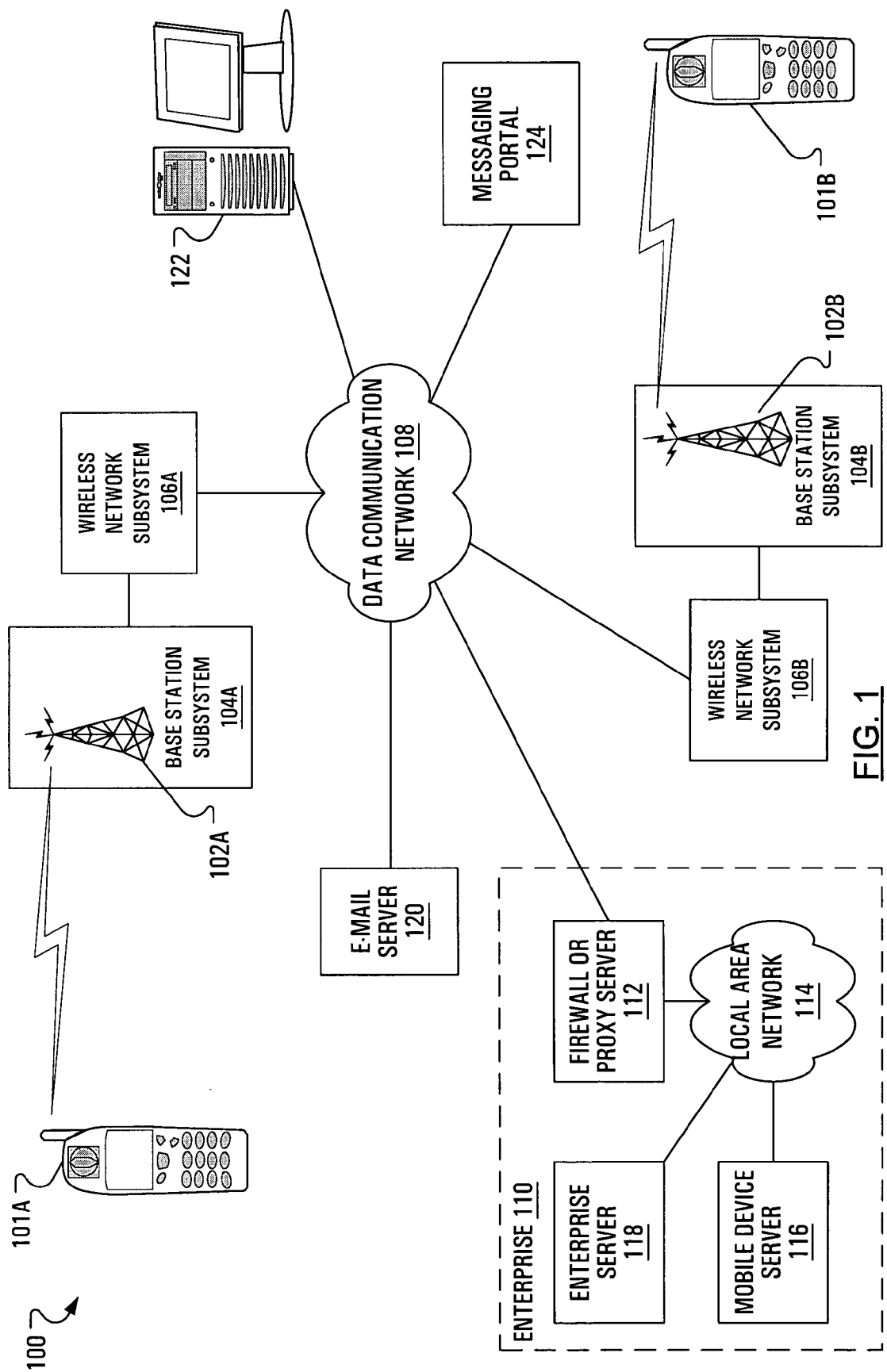
FIG. 1 illustrates elements of an exemplary network environment for a first wireless mobile communication device.

A message received, over a first message handling service, on a mobile wireless communication device may be forwarded using a second message handling service. Message model classes, on which message objects within the wireless communication device are based, are altered to implement a new interface and include method calls for determining, before requesting information elements from a second message object, whether the second message object implements the new interface. Accordingly, when a user wishes to forward a received message object associated with a first message handling service, the user may be provided, by a new verb object, with the option to forward the received message object as a new message object associated with a second message handling service. In the event that the user exercises the option, the new verb object selects a previously existing verb object for generating the new message object associated with the second message handling service. The new verb object passes the received message object to the previously existing verb object for the second message handling service and forwarding is accomplished normally from the perspective of the previously existing verb object. However, the new message object is based on an altered model class and, before requesting information elements from the received message object, determines whether the received message object implements the new interface.

In accordance with an aspect of the present application there is provided a method of forwarding a received message, the method comprising, at a wireless communication device: receiving, over a first message handling service, a message of a first message; instantiating, from an object-oriented donor message class representing the first message type and implementing a predetermined object-oriented interface, a donor message object based on the received message; presenting a user interface at the wireless communication device, the user interface presenting multiple options associated with different message handling services by which a user may elect to forward the received message; upon user selection of one of the options, the selected option being associated with a second message handling service capable of transporting messages of a second message type, requesting information elements from the donor message object via the predetermined interface; receiving the information elements; populating a recipient message object with the information elements, the recipient message object being an instantiation of an object-oriented recipient message class representing the second message type; and performing the forwarding using the recipient message object. In other aspects of the application, a wireless communication device is provided, comprising a processor in communication with memory storing instructions which, upon execution by the processor, adapt the device to perform this method, and a computer readable medium is provided containing computer-executable instructions that, when performed by a processor in a wireless communication device, cause the device to perform this method.

In accordance with an aspect of the present application there is provided a method of forwarding a received message, the method comprising, at a wireless communication device: receiving, over a first message handling service, a message of a first message type, the message type having multiple fields; instantiating, from an object-oriented donor message class representing the first message type and implementing a predetermined object-oriented interface, a donor message object based on the received message; presenting a user interface at the wireless communication device, the user interface presenting multiple options associated with different message handling services by which a user may elect to forward the received message; upon user selection of one of the options, the selected option being associated with a second message handling service capable of transporting messages of a second message type, requesting an information element from the donor message object via the predetermined interface, the information element representing a field of the second message type, the field of the second message type being different from any one of the fields of the first message type; receiving the information element; populating a recipient message object using the information element, the recipient message object being an instantiation of an object-oriented recipient message class representing the second message type, the object-oriented recipient message class defining an organization of the field of the second message type; and performing the forwarding using the recipient message object. In other aspects of the application, a wireless communication device is provided, comprising a processor in communication with memory storing instructions which, upon execution by the processor, adapt the device to forward a message by performing this method, and a computer readable medium is provided containing computer-executable instructions that, when performed by a processor in a wireless communication device, cause the device to forward a message by performing this method.

Other aspects and features of the present application will become apparent to those of ordinary skill in the art upon review of the following description of specific embodiments of the application in conjunction with the accompanying figures.

FIG. 1 illustrates elements of an exemplary network environment 100 for a first wireless mobile communication device 101A. The elements of the exemplary network environment 100 include multiple wireless carrier networks and a data communication network 108, which may be considered to represent at least one wide area network, such as the present day Internet and successors, as well as, potentially, multiple local area networks. A first base station antenna 102A, with which the first wireless mobile communication device 101A may communicate wirelessly, is provided as part of a first base station subsystem 104A.

The first base station subsystem 104A connects to a first wireless network subsystem 106A. In an exemplary Global System for Mobile communications (GSM) implementation, the first wireless network subsystem 106A includes, among other components, a mobile services switching center, a home location register, a visitor location register, a relay and a Short Messaging Service Center (SMSC). As illustrated in FIG. 1, the first wireless network subsystem 106A is connected to the data communication network 108.

Also connected to the data communication network 108 is a second wireless network subsystem 106B. Similar to the first wireless network subsystem 106A, the second wireless network subsystem 106B may include a mobile services switching center, a home location register, a visitor location register, a relay and an SMSC. The second wireless network subsystem 106A connects to a second base station subsystem 104B with a second base station antenna 102B. The second base station antenna 102B may allow the second base station subsystem 104B to communicate wirelessly with a second mobile device 101B.

The first mobile device 101A may be associated with an enterprise 110 connected to the data communication network 108. The enterprise 110 may, for instance, include a firewall or proxy server 112 connecting to the data communication network 108 and to a local area network (LAN) 114. The LAN 114 may allow communication between a mobile device server 116 and an enterprise server 118.

Also connected to the data communication network 108 may be an e-mail server 120 and a desktop computer 122, which may be associated with a user having an account on the e-mail server 120. Also connected to the data communication network 108 may be a messaging portal 124.

Figure 2:
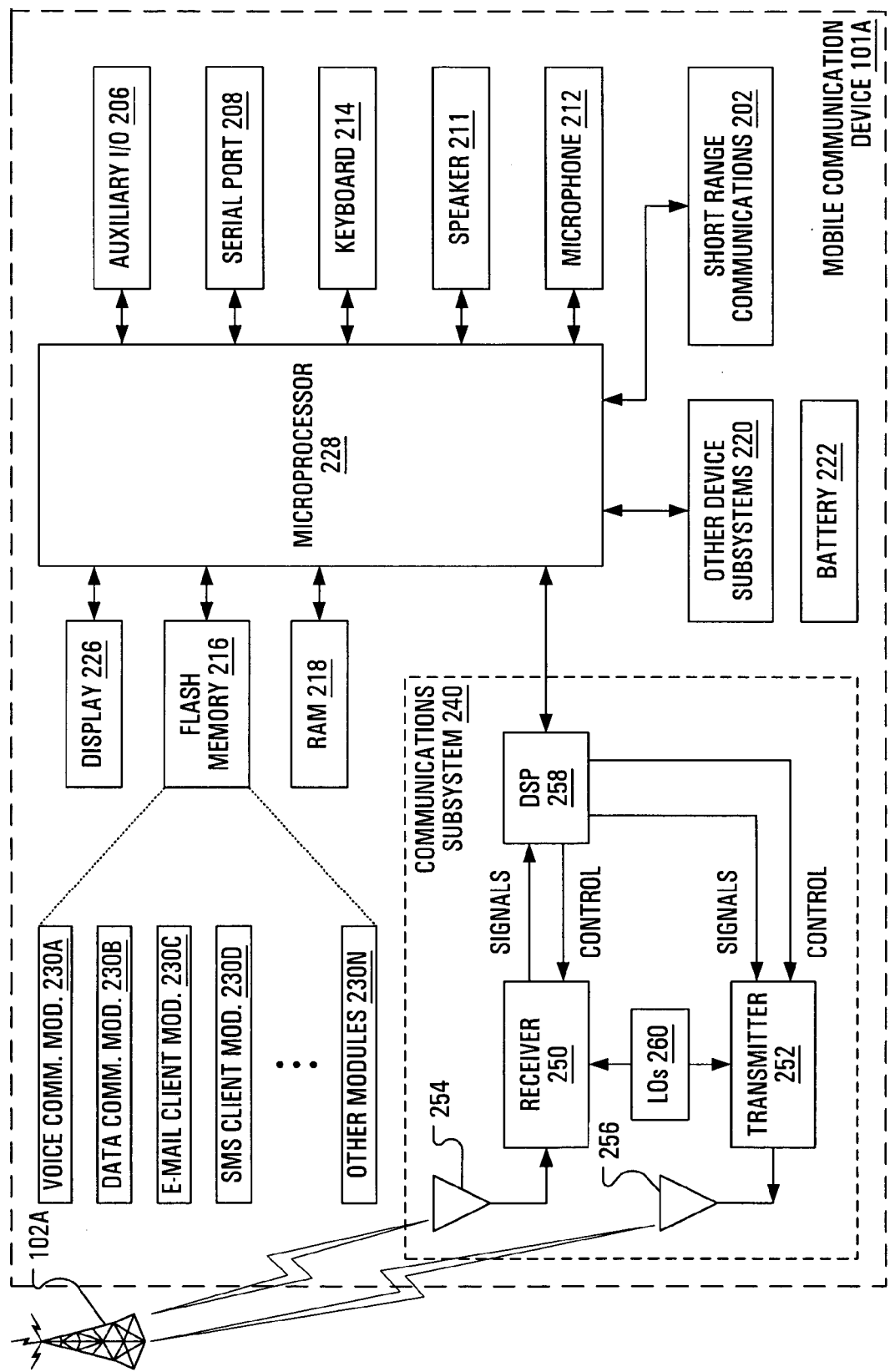
FIG. 2 illustrates components of the first wireless mobile data communication device of FIG. 1, according to an embodiment of the present application.

FIG. 2 illustrates the first wireless mobile communication device 101A including a housing, an input device (a keyboard 214), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 214 and the display 226. The microprocessor 228 controls the operation of the display 226, as well as the overall operation of the first mobile device 101A, in response to actuation of keys on the keyboard 214 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the first mobile device 101A are shown schematically in FIG. 2. These include: a communications subsystem 240; a short-range communications subsystem 202; the keyboard 214 and the display 226, along with other input/output devices including a set of auxiliary I/O devices 206, a serial port 208, a speaker 211 and a microphone 212; as well as memory devices including a flash memory 216 and a Random Access Memory (RAM) 218; and various other device subsystems 220. The first mobile device 101A may have a battery 222 to power the active elements of the first mobile device 101A. The first mobile device 101A is preferably a two-way radio frequency (RF) communication device having voice and data communication capabilities. In addition, the first mobile device 101A preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218.

The microprocessor 228, in addition to its operating system functions, enables execution of software applications on the first mobile device 101A. A predetermined set of software applications that control basic device operations, such as a voice communications module 230A and a data communications module 230B, may be installed on the first mobile device 101A during manufacture. An e-mail client application module 230C may also be installed on the first mobile device 101A during manufacture, to implement aspects of the application. Additionally, an SMS client application module 230D may also be installed on the first mobile device 101A during manufacture, to implement aspects of the application. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network represented in FIG. 2 by the first base station antenna 102A. Preferably, the data items managed by the PIM application are seamlessly integrated, synchronized and updated via the wireless carrier network with the device user's corresponding data items stored or associated with a host computer system.

Communication functions, including data and voice communications, may be performed through the communication subsystem 240 and, possibly, through the short-range communications subsystem 202. The communication subsystem 240 includes a receiver 250, a transmitter 252 and one or more antennas, illustrated as a receive antenna 254 and a transmit antenna 256. In addition, the communication subsystem 240 also includes a processing module, such as a digital signal processor (DSP) 258, and local oscillators (LOs) 260. The specific design and implementation of the communication subsystem 240 is dependent upon the communication network in which the first mobile device 101A is intended to operate. For example, the communication subsystem 240 of the first mobile device 101A may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the first mobile device 101A.

When required network registration or activation procedures have been completed, the first mobile device 101A may send and receive communication signals over the wireless carrier network. Signals received from the first base station antenna 102A by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102A are processed (e.g., modulated and encoded) by the DSP 258 and are then provided to the transmitter 252 for digital to analog conversion, frequency up conversion, filtering, amplification and transmission to the first base station antenna 102A via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 240 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 214 and/or some other auxiliary I/O device 206, such as a touchpad, a rocker switch, a thumb-wheel, or some other type of input device. The composed data items may then be transmitted to the base station antenna 102A via the communication subsystem 240.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the first mobile device 101A. In addition, the display 226 may also be utilized in voice communication mode, for example, to display the identity of a calling party, the duration of a voice call, or other voice call related information.

The short-range communications subsystem 202 enables communication between the first mobile device 101A and other proximate systems or devices, which need not necessarily be similar devices. For example, the short-range communications subsystem 202 may include an infrared device and associated circuits and components, or a Bluetooth™ communication module, to provide for communication with similarly-enabled systems and devices.

An SMS message Protocol Data Unit (PDU) includes a Payload element, Routing Data elements and elements including other metadata. It may be, as is currently typical, that the first mobile device 101A executes code developed using object oriented programming techniques. In which case, an SMS message PDU received the first mobile device 101A may be used as a basis, by code executed on the microprocessor 228, for the creation of a new SMS message object. The new SMS message object may be created as an instance of an SMS message model class, which defines an organization of the payload, routing data and other metadata found in the SMS message PDU. The SMS message model class may also identify those actions that may be performed on the new SMS message object, such as Open, Reply, Forward, etc. Such actions may be performed on the new SMS message object responsive to user interaction with a user interface object.

The actions that may be performed on an SMS message object may be considered to relate to instances of "verb" classes that are specific to the message handling service. As will be clear to a person of ordinary skill in the art of object oriented programming, a verb is an object encapsulation of an action in the Java™ programming language. A verb is often, but not necessarily, presented to the user as an item in a pull down menu or hotkey; a verb contains the code to perform the action on a related data model and information on how to represent itself to the user in zero or more ways. For instance, an SMS Open verb class may be associated with a method that presents a screen on the display 226 in which relevant data regarding a received SMS message PDU may be displayed. Other methods associated with the SMS Open verb class may provide for the extraction, by an instance of the SMS Open verb class (i.e., an SMS Open verb object), of information (payload, routing data and other metadata) from the SMS message object so that the information may be presented as part of the screen.

While the user has focused attention of the user interface of the first mobile device 101A on a screen representation of a given SMS message object, the user may interact with the user interface object, using the keyboard 214 and/or some other auxiliary I/O device 206, to prompt the user interface object to display a menu. Each menu item of the menu may represent an optional action that may be performed on the given SMS message object, such as Open, Reply, Forward, etc. A user may select the Forward menu item.

As a result of this selection, the user interface object may instantiate an SMS Forward verb class and pass the given SMS message object to the newly created SMS Forward verb object. Methods associated with the SMS Forward verb class, may then execute the steps illustrated in FIG. 3.

The given SMS message object may be considered an SMS donor message object. Initially, the SMS Forward verb object may receive the given SMS message object (step 301). Responsive to receiving the SMS donor message object, a method of the SMS Forward verb object may construct an SMS recipient message object (step 302) according, in part, to the SMS message model class. A further method of the SMS Forward verb object may then pass the SMS donor message object to the SMS recipient message object (step 304). A method of the SMS recipient message object may request information elements from the SMS donor message object for use in populating the SMS recipient message object. At the least, the method of the SMS recipient message object may request the payload from the SMS donor message object. A still further method of the SMS Forward verb object may then spawn (306) an SMS message editing screen object to the display 226, where the SMS message editing screen object shows information elements from the SMS recipient message object.

In view of the SMS message editing screen object, the user may input an SMS destination address for the SMS recipient message object and elect to send the SMS recipient message object. The detailed mechanism of the sending of the SMS recipient message object is considered beyond the scope of the present application.

Figure 3:
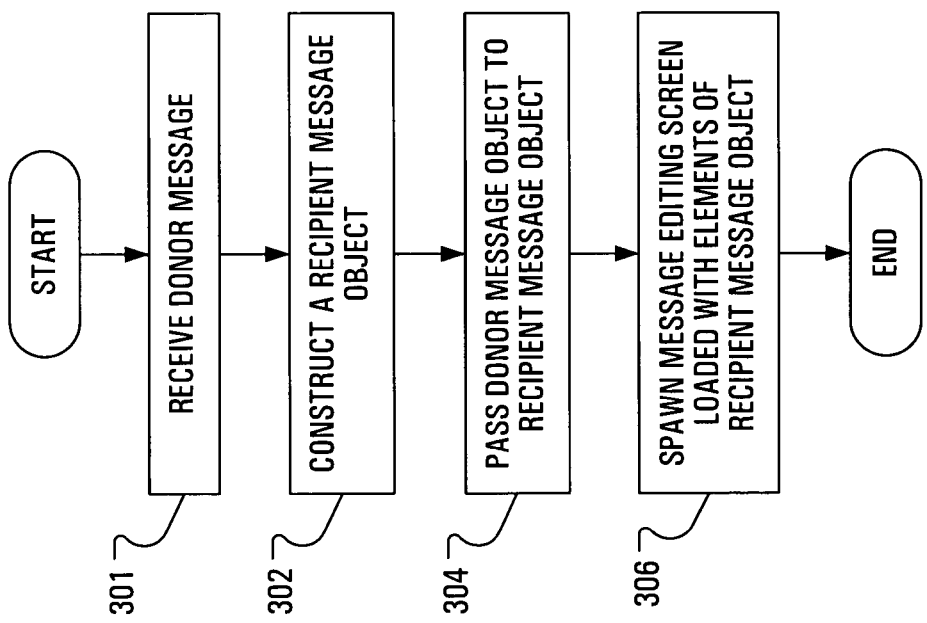
FIG. 3 illustrates steps in a known method of processing messages for forwarding.

FIG. 3 may also be used to illustrate steps in the forwarding of an e-mail message received at the first mobile device 101A. An e-mail message PDU includes a body, subject, routing data and other metadata. As in the case of the received SMS message PDU, an e-mail message PDU received the first mobile device 101A may be used as a basis, by code executed on the microprocessor 228, for the creation of a new e-mail message object. The new e-mail message object may be created as an instance of an e-mail message model class, which defines an organization of the body, subject, routing data and other metadata found in the e-mail message PDU. The e-mail message model class may also identify those actions that may be performed on the new e-mail message object, such as Open, Reply, Forward, etc. Such actions may be performed on the new e-mail message object responsive to user interaction with the user interface object.

While the user has focused attention of the user interface of the first mobile device 101A on a screen representation of a given e-mail message object, the user may interact with the user interface object, using the keyboard 214 and/or some other auxiliary I/O device 206, to prompt the user interface object to display a menu. Each menu item of the menu may represent an optional action that may be performed on the given e-mail message object, such as Open, Reply, Forward, etc. A user may select the Forward menu item.

As a result of this selection, the user interface may instantiate an e-mail Forward verb class and pass the given e-mail message object to the newly created e-mail Forward verb object. Methods associated with the e-mail Forward verb class, may then execute the steps illustrated in FIG. 3.

The given e-mail message object may be considered an e-mail donor message object. Initially, the e-mail Forward verb object may receive the given e-mail message object (step 301). Responsive to receiving the e-mail donor message object, a method of the e-mail Forward verb object may construct an e-mail recipient message object (step 302) according, in part, to the e-mail message model class. A further method of the e-mail Forward verb object may then pass the e-mail donor message object to the e-mail recipient message object (step 304). A method of the e-mail recipient message object may request information elements from the e-mail donor message object for use in populating the e-mail recipient message object. For instance, the method of the e-mail recipient message object may request the body and subject from the e-mail donor message object. A still further method of the e-mail Forward verb object may then spawn (306) an e-mail message editing screen object to the display 226, where the e-mail message editing screen object shows information elements from the e-mail recipient message object.

In view of the e-mail message editing screen object, the user may input one or more e-mail destination addresses for the e-mail recipient message object and elect to send the e-mail recipient message object. The detailed mechanism of the sending of the e-mail recipient message object is considered beyond the scope of the present application.

In contrast to an SMS message payload, a given e-mail message body may be associated with different types of addressing fields such as: a "TO:" field for indicating addresses of primary recipients, a "CC:" field for indicating addresses of secondary recipients and a "BCC:" field for indicating addresses of recipients to kept secret from the other recipients. Additionally, an e-mail message may be further distinguished from an SMS message in that, unlike an SMS message, an e-mail message includes a subject field.

Current GSM SMS standards allow for no more than 160 characters per SMS message, while current TDMA and CDMA networks allow 200 characters per SMS message. In the GSM case, the SMS message payload is standardized as 140 bytes: either 160 7-bit characters, 140 8-bit characters or 70 2-byte characters in languages such as Chinese, Korean, or Japanese when encoded using 2-byte UTF-16 character encoding.

Unfortunately, when a user elects to forward a received message in a first message handling service, it has been, up until now, assumed that the forwarded message will use the same message handling service as the received message. As such, when an SMS recipient message object is passed a donor message object, methods of the SMS recipient message object request information of the donor message object based on an assumption that the donor message object is an SMS donor message object. Equally, when an e-mail recipient message object is passed a donor message object, methods of the e-mail recipient message object request information of the donor message object based on an assumption that the donor message object is an e-mail donor message object.

In overview, each message model class, which is used to define an object based on a received message PDU, may be required to implement a new interface. The new interface may be defined such that, when methods of a recipient message object request information from a donor message object and the donor message object is an instantiation of a message model class that implements the new interface, the donor message object may respond to the request without regard for the type of message PDU on which the donor message object is based. The new interface may be called, for example, "MessagePartsProvider".

That is, the donor message object may be an e-mail donor message object or an SMS donor message object and the recipient message object may be an e-mail recipient message object or an SMS recipient message object. The recipient message object is configured to determine whether the donor message object implements the new interface. In the event that the donor message object implements the new interface, the recipient message object may make any of a predetermined set of requests of the donor message object. By virtue of implementing the new interface, the donor message object is configured to respond to all of the predetermined set of requests.

It should be clear that, while examples herein concentrate on SMS messages and e-mail messages, other types of data, such as pages composed in a markup language, facsimile messages, Instant Messaging (IM) messages, Multimedia Message Service (MMS) messages, Address Book-based messages or Calendar-based messages, may be either the donor message object or the recipient message object.

Furthermore, a new verb class, a Forward As verb class, may be defined to allow a user to elect to forward a received message object associated with the first message handling service as a new message object using a second message handling service. Each message model may already include a method call that may be used, say, by a user interface object, to determine the verb classes to associate with a message object whose creation is based on the message model. The message models that implement the MessagePartsProvider interface may be slightly modified to include the "Forward As" verb class in the list of verb classes returned by this method call.

In operation, while the user has focused attention of the user interface of the first mobile device 101A (e.g., opened or highlighted in a list) on a screen representation of, for example, a given e-mail message object, the user may interact with the user interface object, using the keyboard 214 and/or some auxiliary I/O device 206, to prompt the user interface object to display a menu. Some of the menu items may represent an optional action that may be performed on the given e-mail message object, such as Open, Reply, Forward, Forward As, etc.

Figure 4:
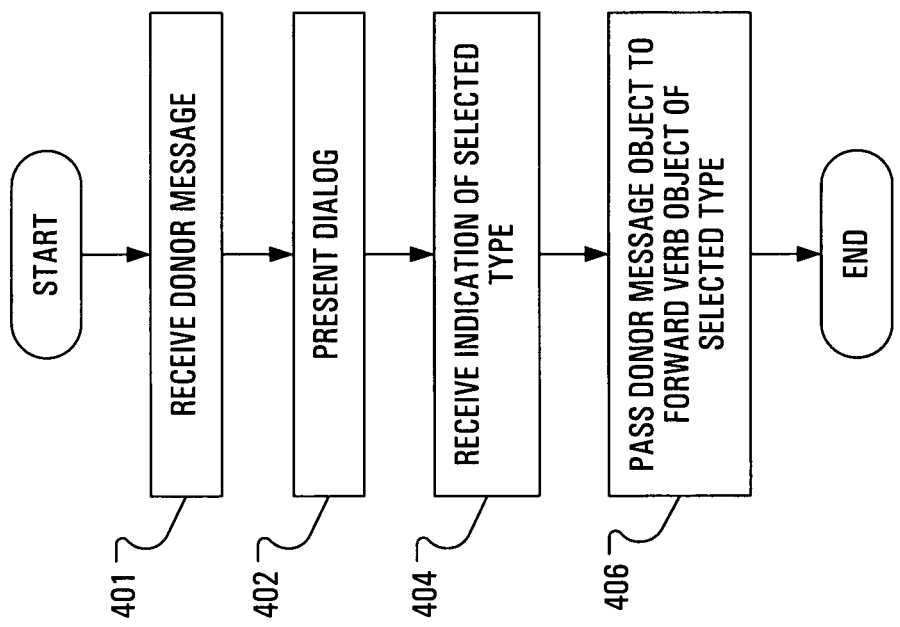
FIG. 4 illustrates steps in a method of handling messages for forwarding according to an embodiment of the present application.

A user may select the Forward As menu item. As a result of this selection, the user interface object may instantiate the Forward As verb class and pass the given e-mail donor message object to the newly created Forward As verb object. The Forward As verb object may then call associated methods to execute the steps illustrated in FIG. 4.

The given e-mail donor message object may be considered a generic donor message object. That is, since the e-mail model class, instantiation of which led to the given e-mail donor message object, implemented the MessagePartsProvider interface, the donor message object need not be a SMS donor message object to appropriately respond to requests from an SMS recipient message object.

Initially, the Forward As verb object may receive the given e-mail donor message object (step 401). Responsive to receiving the given e-mail donor message object, a method of the Forward As verb object may construct a dialog object and instruct the dialog to present itself on the display 226 (step 402). The dialog object may include as many options as types (E.G., SMS, e-mail) of Forward verb objects are available on the first mobile device 101A. The user may interact with the dialog object, using the keyboard 214 and/or some auxiliary I/O device 206, to select one of the presented types. A method of the Forward As verb object may receive an indication of the selected type (step 404), say, from a method of the dialog object. Responsive to receiving the indication of the selected type, a method of the Forward As verb object may then pass the generic donor message object (step 406) to the Forward verb object of the selected type. The Forward verb object of the selected type may then operate normally, as discussed above in conjunction with reference to FIG. 3.

Figure 5:
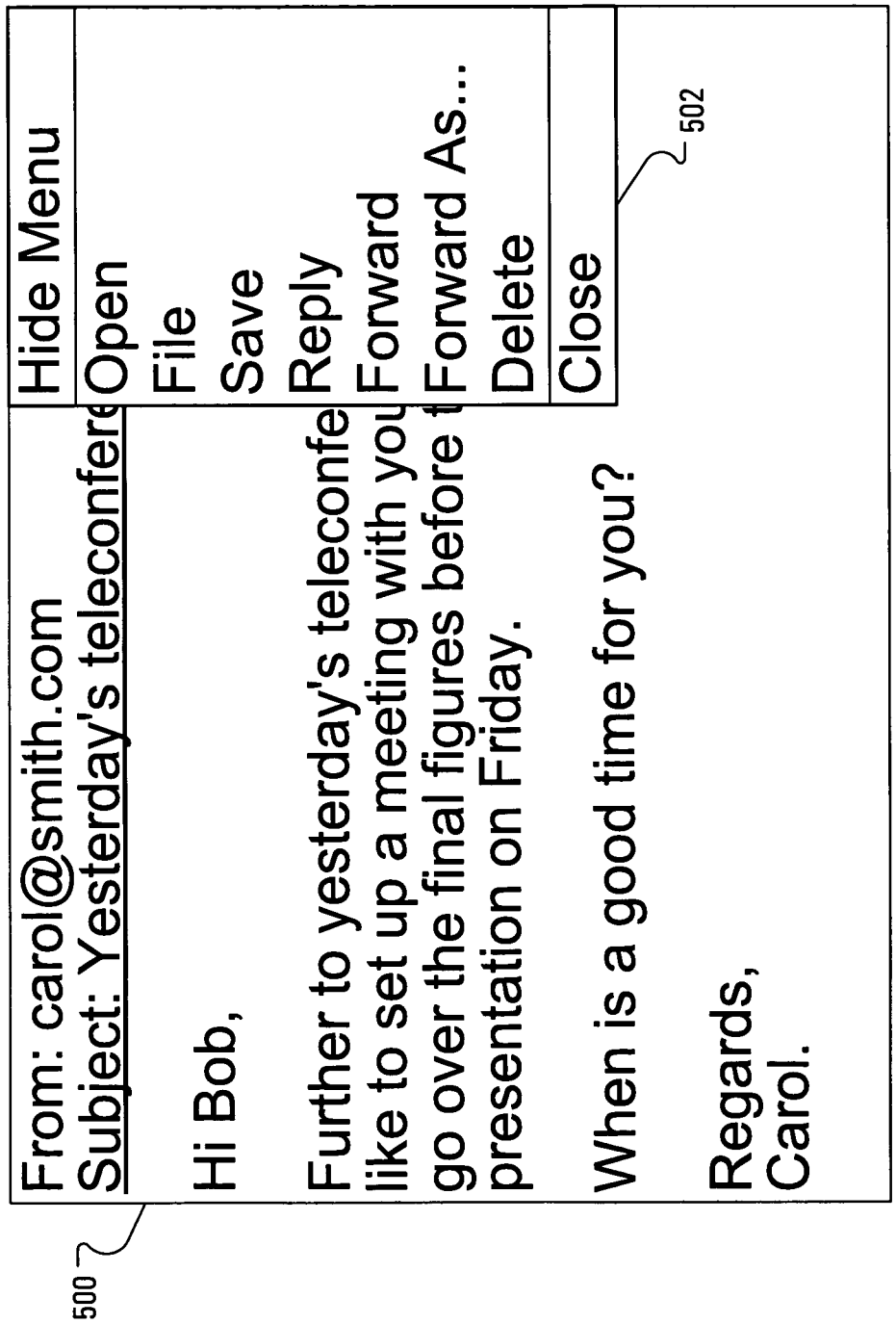
FIG. 5 illustrates an exemplary e-mail message viewing screen presented by a user interface object for a received e-mail donor message object that implements a new interface.

Exemplary operation of the Forward As verb object in combination with the Forward verb object may be considered in view of FIGS. 5-10. FIG. 5 illustrates an exemplary e-mail message viewing screen 500 presented by the user interface object allowing a user to view elements of a received e-mail donor message object. The user may, as discussed above, interact with the user interface object to prompt the user interface object to display a menu 502.

Figure 6:
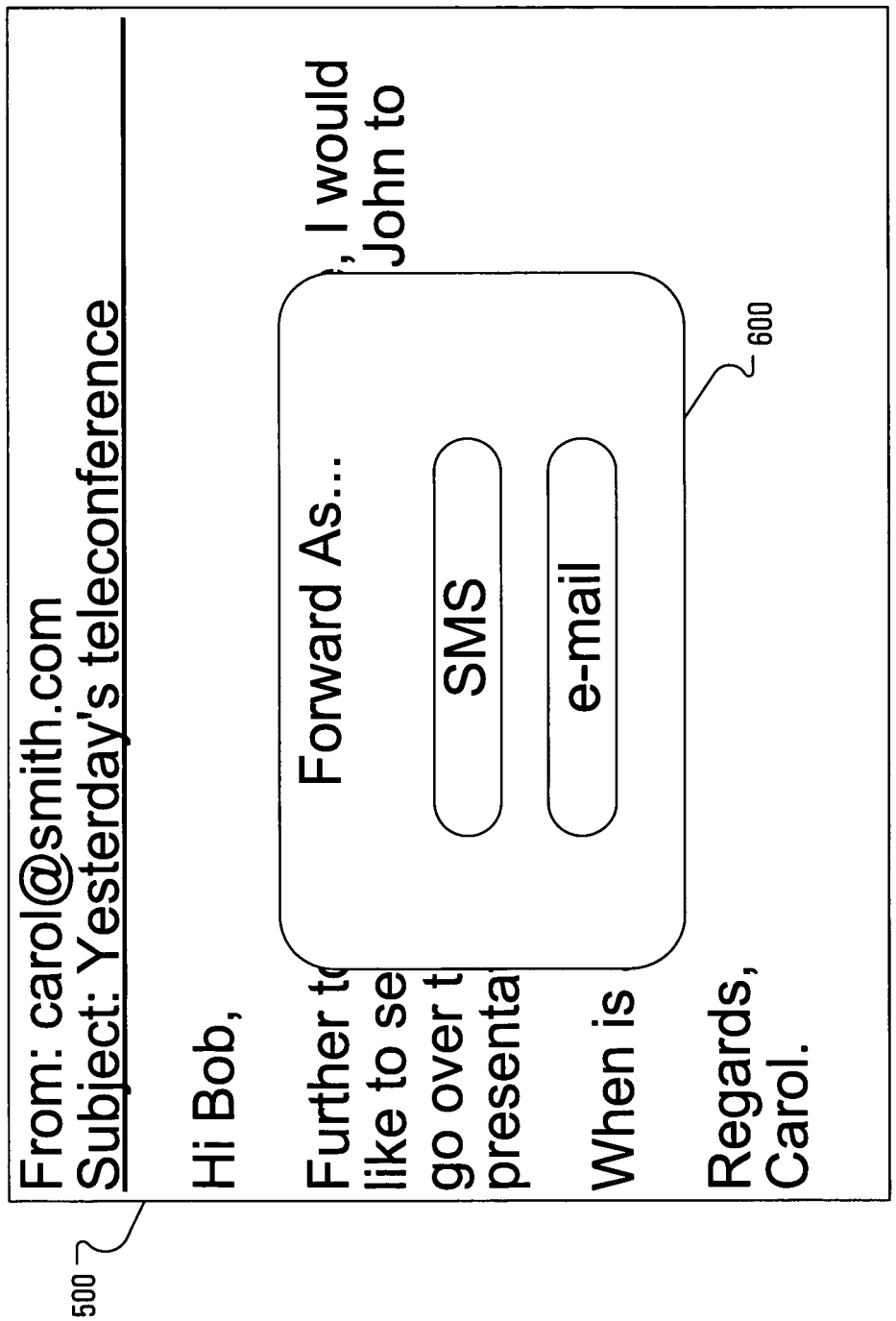
FIG. 6 illustrates the exemplary e-mail message viewing screen of FIG. 5 overlaid by a dialog according to an embodiment of the present application.

User selection of the Forward As menu item results, as discussed above, in instantiation of the Forward As verb object and the user interface object passing the given e-mail donor message object to the Forward As verb object. The Forward As verb object, responsive to receiving the given e-mail donor message object (step 401, FIG. 4) arranges the presentation (step 402) of a dialog object 600, as illustrated in FIG. 6. The exemplary dialog object 600 presents optional message types (message handling services) e-mail and SMS. An indication of a user selection of the SMS message type is received (step 404) by the Forward As verb object. Responsive to receiving the indication of the user selection of the SMS message type, a method of the Forward As verb object may then pass (step 406) the received e-mail donor message object to the SMS Forward verb object.

The received (step 301, FIG. 3) e-mail donor message object may be considered, by the SMS Forward verb object, to be a donor message object without identity, since the SMS Forward verb object does not need to perform any object type-specific processing on the donor message object. A method of the SMS Forward verb object may construct an SMS recipient message object (step 302) according, in part, to the SMS message model class. A further method of the SMS Forward verb object may then pass the received e-mail donor message object to the SMS recipient message object (step 304). A method of the SMS recipient message object may request information elements from the received e-mail donor message object for use in populating the SMS recipient message object. A still further method of the SMS Forward verb object may then spawn (step 306) an SMS message editing screen object to the display 226, where the SMS message editing screen object shows information elements from the SMS recipient message object.

Figure 7:
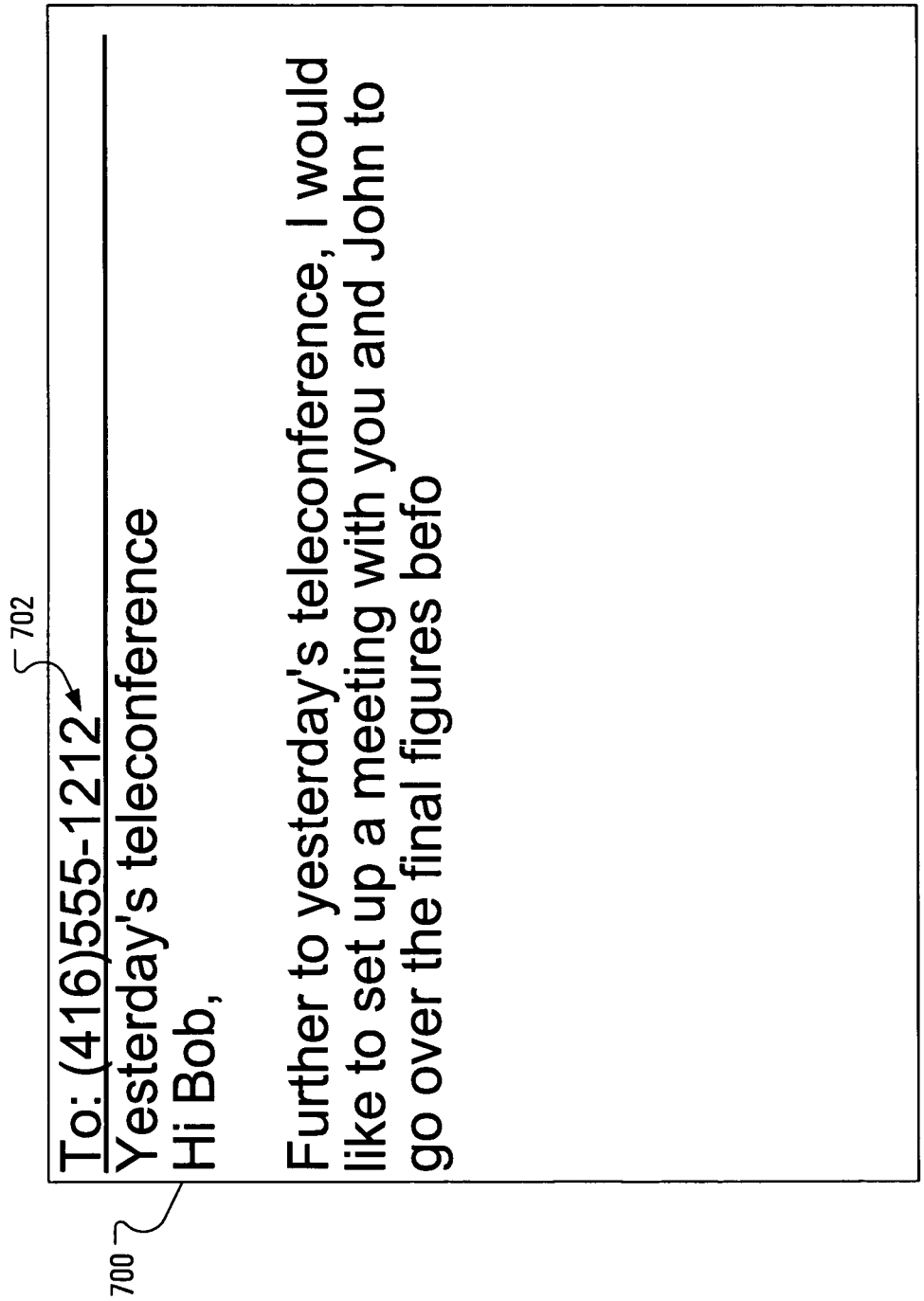
FIG. 7 illustrates an exemplary SMS message composition screen resulting from the selection of the e-mail option in the dialog of FIG. 6.

FIG. 7 illustrates an exemplary SMS message editing screen object 700 spawned by the still further method of the SMS Forward verb object with information elements from the SMS recipient message object based on responses from the received e-mail donor message object, whose information elements are displayed in the exemplary e-mail message viewing screen 500 of FIG. 5. The exemplary SMS message editing screen object 700 allows a user to provide an SMS destination address 702 for the SMS recipient message object.

Figure 8:
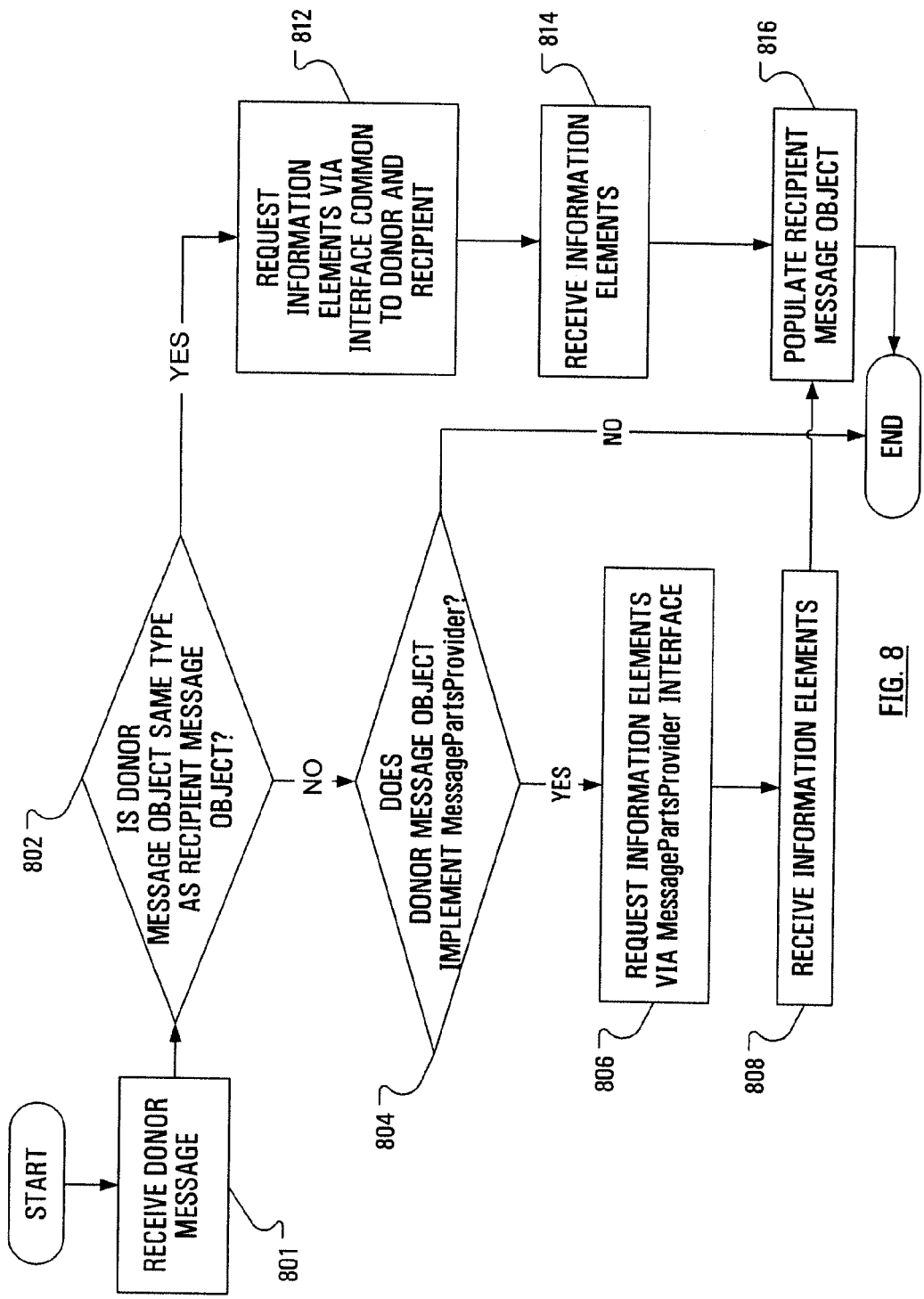
FIG. 8 illustrates steps in a method of processing a donor message object to produce a recipient message object according to an embodiment of the present application.

FIG. 8 illustrates steps of an exemplary method undertaken by the SMS recipient message object to populate itself. Initially, the SMS recipient message object receives (step 801) the received e-mail donor message object. Before the method of the SMS recipient message object requests information elements from the received e-mail donor message object for use in populating the SMS recipient message object, the method of the SMS recipient message object may determine (step 802) whether the received e-mail donor message object is of the same type as the recipient message object. If, as in this case, the type of the donor message object differs from the type of the recipient message object, the method of the SMS recipient message object may determine (step 804) whether the received e-mail donor message object implements the MessagePartsProvider interface. To this end, the SMS recipient message object may request that the received e-mail donor message object indicate whether the MessagePartsProvider interface is implemented. Upon determining that the received e-mail donor message object does implement the MessagePartsProvider interface, the method of the SMS recipient message object may request (step 806) information elements (e.g., a Subject element; a Body element) from the received e-mail donor message object via the MessagePartsProvider interface. The SMS recipient message object may then receive (step 808) the requested information elements from the received e-mail donor message object. Using the received Subject element and Body element, the SMS recipient message object may populate itself (step 816).

Upon determining (step 804) that the received donor message object does not implement the MessagePartsProvider interface, the method of the SMS recipient message object may end, since it may be considered that the does not have an appropriate interface to handle the donor message object.

Upon determining (step 802), in another case, that the received donor message object is of the same type as the recipient message object, the method of the SMS recipient message object may request (step 812) information elements (e.g., a Payload element) from the received donor message object via an SMS-specific interface. The SMS recipient message object may then receive (step 814) the information elements from the received donor message object. Using the received Payload element, the SMS recipient message object may populate itself (step 816).

When the still further method of the SMS Forward verb object spawns (step 306, FIG. 3) the exemplary SMS message editing screen object 700, a method of the exemplary SMS message editing screen object 700 may request the Payload element from the SMS recipient message object. It may be that the Payload element exceeds the character limit of a standard SMS message, in which case, the exemplary SMS message editing screen object 700 may truncate the received Payload element (as shown in FIG. 7) to conform to the SMS standard. The exemplary SMS message editing screen object 700 may inform the user, for example, by way of a dialog object, that the payload has been truncated.

SMS message editing screen classes are known to exist that allow the construction of a "macro" SMS message with more characters than are allowed in a standard SMS message. Such a macro SMS message editing screen object may request the Payload element from the SMS recipient message object and the SMS recipient message object may respond to the request with a Payload element that exceeds the character limit of a standard SMS message. In such a case, the macro SMS message editing screen object may split the Payload element into Payload sub-elements that fit into the character limit of a standard SMS message and arrange the transmission of multiple SMS messages, where each SMS message includes one of the Payload sub-elements.

The user may address the SMS message by directly entering a telephone directory number (i.e., routing data, an SMS destination address) of an SMS-capable entity (say, the second mobile device 101B) in the address field presented as part of the user interface of the SMS client application. Alternatively, rather than directly entering a telephone directory number, the user may indicate, to the exemplary SMS message editing screen object 700, a desire to select a contact from within a list of contact information maintained by the PIM application. Once the contact is selected, the user may then be presented with all telephone directory numbers associated with the contact. The user may then select one of the presented telephone directory numbers as the SMS destination address 702 for the SMS recipient message object.

When the user has completed composition of the SMS message payload, the user may indicate that the SMS message payload is complete and should be sent. Further objects executed by the first mobile device 101A may then arrange the transmission of an SMS message based on the SMS recipient message object to the first base station antenna 102A via the communication subsystem 240. The detailed mechanism of the sending of the SMS recipient message object is considered beyond the scope of the present application.

The SMS message received at the first base station antenna 102A may be later received at the mobile services switching center in the first wireless network subsystem 106A. From the mobile services switching center, the SMS message may be sent to the SMSC, which may also be in the first wireless network subsystem 106A. The SMSC may arrange the delivery of the SMS message to the second mobile device 101B via the data communication network 108, the second wireless network subsystem 106B and the second base station subsystem 104B.

Figure 9:
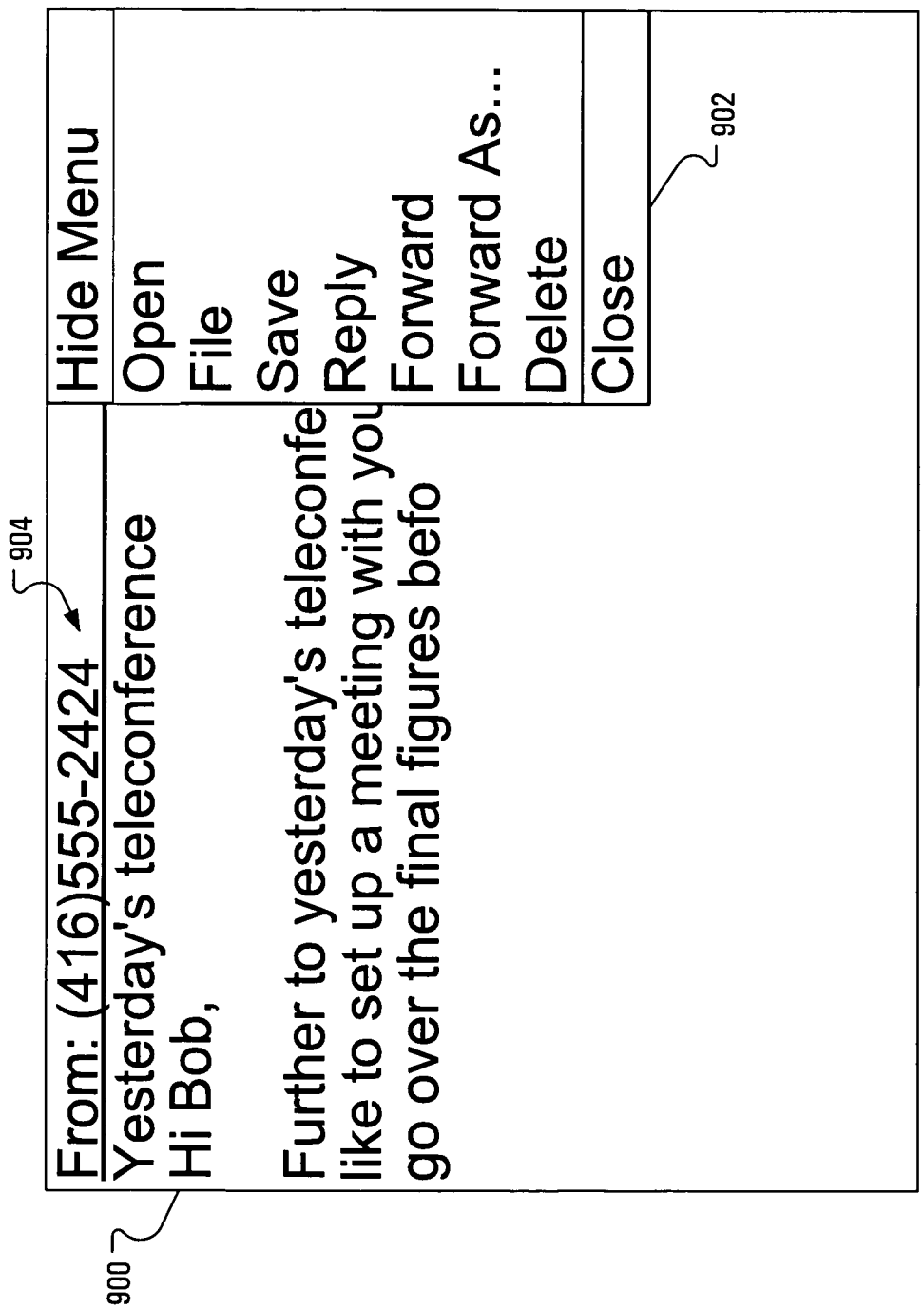
FIG. 9 illustrates an exemplary SMS message viewing screen presented by a user interface object for a received SMS donor message object that implements the new interface.

FIG. 9 illustrates an exemplary SMS message viewing screen 900 presented by a user interface object of the second mobile device 101B allowing a user to view information elements of a received SMS donor message object. In the illustrated case, the received SMS donor message object is based on the new SMS donor message object, information elements of which are presented in the exemplary SMS message editing screen object 700 of FIG. 7. The user may, as discussed above, interact with the user interface object to prompt the user interface object to display a menu 902.

Figure 10:
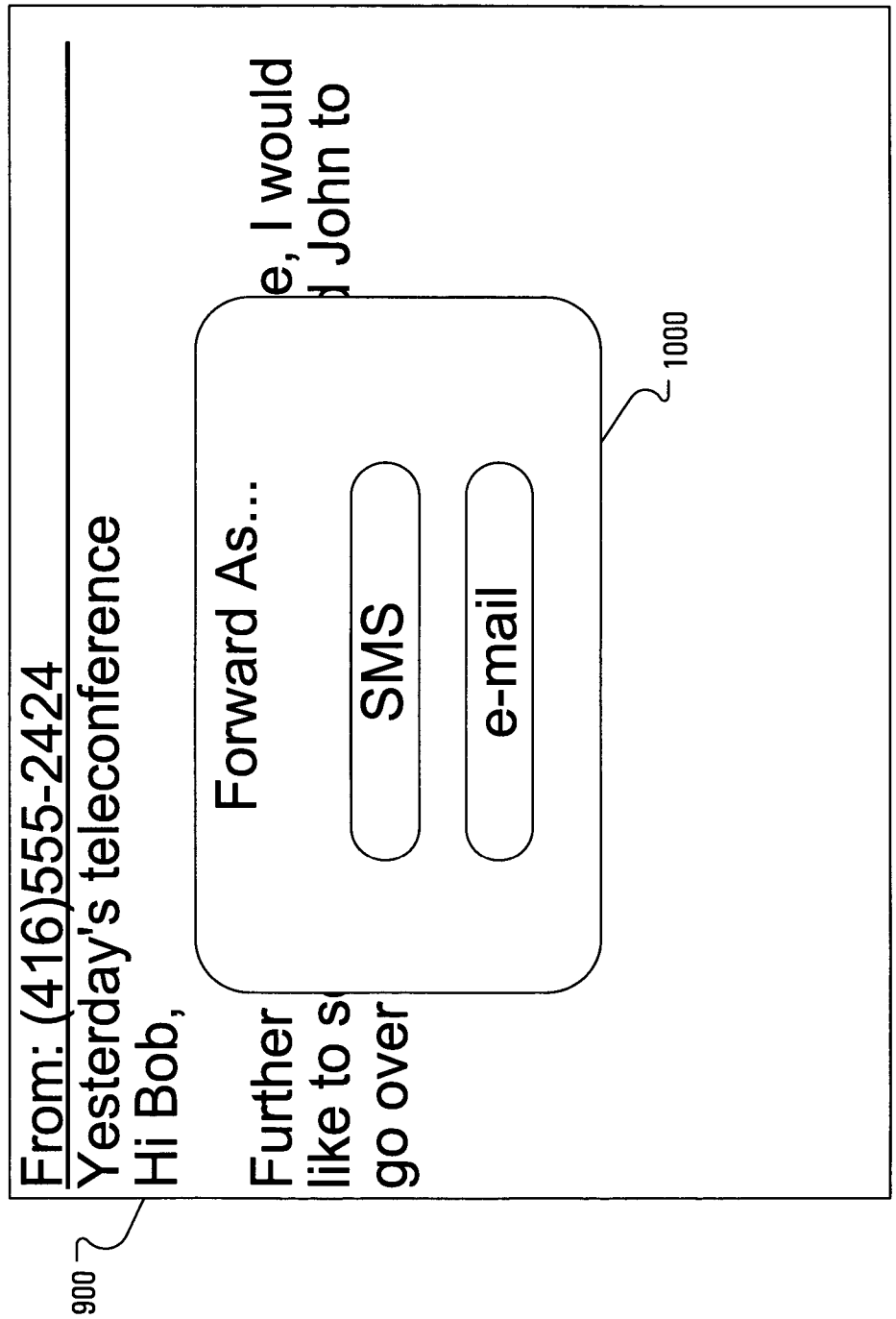
FIG. 10 illustrates the exemplary SMS message viewing screen of FIG. 9 overlaid by a dialog according to an embodiment of the present application.

User selection of the Forward As menu item results, as discussed above, in instantiation of the Forward As verb object and the user interface object passing the given SMS donor message object to the Forward As verb object. The Forward As verb object, responsive to receiving the given SMS donor message object (step 401, FIG. 4) arranges the presentation (step 402) of a dialog object 1000, as illustrated in FIG. 10. The exemplary dialog object 1000 presents optional message types: e-mail; and SMS. An indication of a user selection of the e-mail message type is received (step 404) by the Forward As verb object. A method of the Forward As verb object may then pass (step 406) the received SMS donor message object to the e-mail Forward verb object.

The received SMS donor message object may be considered, by the e-mail Forward verb object, to be a donor message object without identity, since the e-mail Forward verb object does not need to perform any object type-specific processing on the donor message object. A method of the e-mail Forward verb object may construct an e-mail recipient message object (step 302) according, in part, to the e-mail message model class. A further method of the e-mail Forward verb object may then pass the received SMS donor message object to the e-mail recipient message object (step 304). A method of the e-mail recipient message object may request information elements from the received SMS donor message object for use in populating the e-mail recipient message object. A still further method of the e-mail Forward verb object may then spawn (step 306) an e-mail message editing screen object to the display 226, where the e-mail message editing screen object shows information elements from the e-mail recipient message object.

FIG. 11 illustrates an exemplary e-mail message editing screen object 1100 spawned by the still further method of the e-mail Forward verb object with information elements from the e-mail recipient message object based on responses from the received SMS donor message object, whose information elements are displayed in the exemplary SMS message viewing screen 900 of FIG. 9.

Initially, the e-mail recipient message object receives (step 801, FIG. 8) the received SMS donor message object. Before the method of the e-mail recipient message object requests information elements from the received SMS donor message object for use in populating the e-mail recipient message object, the method of the e-mail recipient message object may determine (step 802) whether the received SMS donor message object is of the same type as the recipient message object.

If, as in this case, the type of the donor message object differs from the type of the recipient message object, the method of the e-mail recipient message object may determine (step 804) whether the received SMS donor message object implements the MessagePartsProvider interface. As in the case of the SMS recipient message object, the e-mail recipient object may request that the received SMS donor message object indicate whether the MessagePartsProvider interface is implemented. Upon determining that the received SMS donor message object does implement the MessagePartsProvider interface, the method of the e-mail recipient message object may request (step 806) several information elements (a Subject element; a Sender element; a Date Sent element; a Body element) from the received SMS donor message object via the MessagePartsProvider interface. The e-mail recipient message object may then receive (step 808) the requested information elements from the SMS donor message object. Using the received information elements, the e-mail recipient message object may populate itself (step 1816).

When the method of the e-mail recipient message object requests (step 806) the Subject element, in particular, from the received SMS donor message object via the MessagePartsProvider interface, the received SMS donor message object may process the Payload element to create a Subject element from a portion of the first 25 characters of the Payload element. Once the received SMS donor message object has created the Subject element, the received SMS donor message object may respond to the request from the e-mail recipient message object with the created Subject element.

The created Subject element may include characters up to a cut-off point, where the cut-off point is defined as: the first carriage return in the Payload element; the first period in the Payload element; the first exclamation mark in the Payload element; or the first question mark in the Payload element. If none of these exemplary cut-off characters are found, the cut-off point may be defined as the first comma the Payload element. If a comma character is not found, the cut-off point may be defined as the last white space before the 25-character point in the Payload element. If a white space is not found before the 25-character point, the cut-off point may be defined as the 25-character point itself.

Upon determining (step 804) that the received donor message object does not implement the MessagePartsProvider interface, the method of the e-mail recipient message object may end, since it may be considered that the does not have an appropriate interface to handle the donor message object.

Upon determining (step 802), in another case, that the received donor message object is of the same type as the recipient message object, the method of the e-mail recipient message object may request (step 812) information elements from the received donor message object using via an e-mail-specific interface. The e-mail recipient message object may then receive (step 814) the information elements from the received donor message object. Using the received information elements, the e-mail recipient message object may populate itself (step 816).

When the still further method of the e-mail Forward verb object spawns (step 306, FIG. 3) the exemplary e-mail message editing screen object 1100, a method of the exemplary e-mail message editing screen object 1100 may request the Body element from the e-mail recipient message object. The e-mail recipient message object may respond to the request with a Body element created through requests to the received SMS donor message object.

As illustrated in FIG. 11, the exemplary e-mail message editing screen object 1100 includes a Body element as supplied by the e-mail recipient message object. The Body element is illustrated as formed from a Sender element 1104, a Date Sent element 1106 and a Payload element 1108. The exemplary e-mail message editing screen object 1100 also includes a Subject element 1102 as supplied by the e-mail recipient message object.

The exemplary e-mail message editing screen object 1100 allows a user to provide an e-mail destination address 1110 for the e-mail recipient message object.

As will be understood by a person of ordinary skill in the art, although the above description provides, as exemplary message handling services, the known SMS transport mechanism and the known e-mail message transport mechanism, aspects of the present application may be applicable for several other message handling services such as those message handling services concerned with handling pages composed in a markup language, facsimile messages, IM messages, voice mail messages, Address Book-based messages or Calendar-based messages. Additionally, the known Multimedia Messaging Service (MMS) is a further exemplary message handling service that may be seen as an extension of the SMS transport mechanism. MMS currently provides for transmission, from a wireless mobile communication device, of up to 100 kilobytes of data, such as text, short musical pieces, digital still images and brief digital video sequences. Additionally, often mobile device manufacturers or service providers may offer proprietary mobile device-to-mobile device transport mechanisms.

In summary then, the message model classes are altered to implement a new interface and include method calls that determine, before requesting information elements from a second message object, whether the second message object implements the new interface. Accordingly, when a user wishes to forward a received message object associated with a first message handling service, the user may be provided, by a new verb object, with the option to forward the received message object as a new message object associated with a second message handling service. In the event that the user exercises the option, the new verb object selects the correct, previously existing verb object for generating the new message object associated with the second message handling service. The new verb object passes the received message object to the previously existing verb object for the second message handling service and forwarding is accomplished normally from the perspective of the previously existing verb object. However, the new message object is based on an altered model class and, when requesting information elements from the received message object, the new message object determines whether the received message object implements the new interface.

Other modifications will be apparent to those skilled in the art and, therefore, the invention is defined in the claims.

We claim:

1. A method of forwarding a received message, the method comprising, at a wireless communication device:
   receiving, over a first message handling service, a message of a first message type, the receiving resulting in a received message;
   instantiating, from an object-oriented donor message class representing the first message type and implementing a predetermined object-oriented interface, a donor message object based on the received message;
   presenting a user interface at the wireless communication device, the user interface presenting multiple user-selectable options associated with different message handling services for forwarding the received message;
   upon user selection of one of the options, the selected option being associated with a second message handling service that transports messages of a second message type, requesting information elements from the donor message object via the predetermined object-oriented interface;
   receiving the information elements;
   populating a recipient message object with the information elements, the recipient message object being an instantiation of an object-oriented recipient message class representing the second message type; and
   performing the forwarding of the received message using the recipient message object,
   wherein the first message handling service is a Short Messaging Service (SMS), the received message is an SMS message and the second message handling service is an e-mail service,
   and wherein the information elements comprise a Subject element and further comprising generating the Subject element from a portion of a payload of the SMS message.

2. A wireless communication device comprising a processor in communication with memory storing instructions which, upon execution by the processor, adapt the device to:
   receive, over a first message handling service, a message of a first message type, the receiving resulting in a received message;
   instantiating, from an object-oriented donor message class representing the first message type and implementing a predetermined object-oriented interface, a donor message object based on the received message;
   present a user interface at the wireless communication device, the user interface presenting multiple user-selectable options associated with different message handling services for forwarding the received message;
   upon user selection of one of the options, the selected option being associated with a second message handling service that transports messages of a second message type, request information elements from the donor message object via the predetermined object-oriented interface;
   receive the information elements;
   populate a recipient message object with the information elements, the recipient message object being an instantiation of an object-oriented recipient message class representing the second message type; and
   forward the received message using the recipient message object,
   wherein the first message handling service is a Short Messaging Service (SMS), the received message is an SMS message and the second message handling service is an e-mail service,
   and wherein the information elements comprise a Subject element and further comprising generating the Subject element from a portion of a payload of the SMS message.

3. A non-transitory computer readable medium containing computer-executable instructions that, when performed by a processor in a wireless communication device, cause the device to:
   receive, over a first message handling service, a message of a first message type, the receiving resulting in a received message;
   instantiate, from an object-oriented donor message class representing the first message type and implementing a predetermined object-oriented interface, a donor message object based on the received message;
   present a user interface at the wireless communication device, the user interface presenting multiple user-selectable options associated with different message handling services for forwarding the received message;
   upon user selection of one of the options, the selected option being associated with a second message handling service that transports messages of a second message type, request information elements from the donor message object via the predetermined object-oriented interface;
   receive the information elements;
   populate a recipient message object with the information elements, the recipient message object being an instantiation of an object-oriented recipient message class representing the second message type; and
   perform the forwarding of the received message using the recipient message object,
   wherein the first message handling service is a Short Messaging Service (SMS), the received message is an SMS message and the second message handling service is an e-mail service,
   and wherein the information elements comprise a Subject element and further comprising generating the Subject element from a portion of a payload of the SMS message.

4. The method of claim 1 wherein the portion of the payload of the SMS message is a plurality of characters up to a cut-off point within the payload of the SMS message.

5. The method of claim 4 wherein the cut-off point is one of a first period in the payload, a first exclamation mark in the payload, a first question mark in the payload, or a first comma in the payload.

6. The method of claim 4 wherein the cut-off point is a last white space character within a first N characters of the payload, where N is a predetermined integer.

7. The device of claim 2 wherein the portion of the payload is a plurality of characters up to a cut-off point within the payload.

8. The device of claim 7 wherein the cut-off point is one of a first period in the payload, a first exclamation mark in the payload, a first question mark in the payload, or a first comma in the payload.

9. The device of claim 8 wherein the cut-off point is a last white space character within a first N characters of the payload, where N is a predetermined integer.

10. A method of forwarding a received message, the method comprising, at a wireless communication device:
  receiving, over a first message handling service, a message of a first message type, the message type having multiple fields, the receiving resulting in a received message;
  instantiating, from an object-oriented donor message class representing the first message type and implementing a predetermined object-oriented interface, a donor message object based on the received message;
  presenting a user interface at the wireless communication device, the user interface presenting multiple user-selectable options associated with different message handling services for forwarding the received message;
  upon user selection of one of the options, the selected option being associated with a second message handling service that transports messages of a second message type, requesting an information element from the donor message object via the predetermined object-oriented interface, the information element representing a field of the second message type, the field of the second message type being different from any one of the fields of the first message type;
  receiving the information element;
  populating a recipient message object using the information element, the recipient message object being an instantiation of an object-oriented recipient message class representing the second message type, the object-oriented recipient message class defining an organization of the field of the second message type; and
  performing the forwarding of the received message using the recipient message object.

11. A wireless communication device comprising a processor in communication with memory storing instructions which, upon execution by the processor, adapt the device to forward a message by:
  receiving the message over a first message handling service, the message being of a first message type, the message type having multiple fields, the receiving resulting in a received message;
  instantiating, from an object-oriented donor message class representing the first message type and implementing a predetermined object-oriented interface, a donor message object based on the received message;
  presenting a user interface at the wireless communication device, the user interface presenting multiple user-selectable options associated with different message handling services for forwarding the received message;
  upon user selection of one of the options, the selected option being associated with a second message handling service that transports messages of a second message type, requesting an information element from the donor message object via the predetermined object-oriented interface, the information element representing a field of the second message type, the field of the second message type being different from any one of the fields of the first message type;
  receiving the information element;
  populating a recipient message object using the information element, the recipient message object being an instantiation of an object-oriented recipient message class representing the second message type, the object-oriented recipient message class defining an organization of the field of the second message type; and
  performing the forwarding of the received message using the recipient message object.

12. A non-transitory computer readable medium containing computer-executable instructions that, when performed by a processor in a wireless communication device, cause the device to forward a message by:
  receiving the message over a first message handling service, the message being of a first message type, the message type having multiple fields, the receiving resulting in a received message;
  instantiating, from an object-oriented donor message class representing the first message type and implementing a predetermined object-oriented interface, a donor message object based on the received message;
  presenting a user interface at the wireless communication device, the user interface presenting multiple user-selectable options associated with different message handling services for forwarding the received message;
  upon user selection of one of the options, the selected option being associated with a second message handling service that transports messages of a second message type, requesting an information element from the donor message object via the predetermined object-oriented interface, the information element representing a field of the second message type, the field of the second message type being different from any one of the fields of the first message type;
  receiving the information element;
  populating a recipient message object using the information element, the recipient message object being an instantiation of an object-oriented recipient message class representing the second message type, the object-oriented recipient message class defining an organization of the field of the second message type; and
  performing the forwarding of the received message using the recipient message object.

13. The method of claim 10 wherein the first message handling service is a Short Messaging Service (SMS), wherein the received message is an SMS message, wherein the second message handling service is an e-mail service, wherein the second message type is e-mail, wherein the information element represents an e-mail Subject field and further comprising generating the Subject element from a portion of a payload of the SMS message, the portion comprising a plurality of characters up to a cut-off point within the payload of the SMS message.

14. The method of claim 13 wherein the cut-off point is one of a first period in the payload, a first exclamation mark in the payload, a first question mark in the payload, or a first comma in the payload.

15. The method of claim 13 wherein the cut-off point is a last white space character within a first N characters of the payload, where N is a predetermined integer.

16. The computing device of claim 11 wherein the first message handling service is a Short Messaging Service (SMS), wherein the received message is an SMS message, wherein the second message handling service is an e-mail service, wherein the second message type is e-mail, wherein the information element represents an e-mail Subject field and wherein the computer-executable instructions cause the computing device to generate the Subject element from a portion of a payload of the SMS message, the portion comprising a plurality of characters up to a cut-off point within the payload of the SMS message.

17. The computing device of claim 16 wherein the cut-off point is one of a first period in the payload, a first exclamation mark in the payload, a first question mark in the payload, or a first comma in the payload.

18. The computing device of claim 16 wherein the cut-off point is a last white space character within a first N characters of the payload, where N is a predetermined integer.

19. The non-transitory computer-readable medium of claim 12 wherein the first message handling service is a Short Messaging Service (SMS), wherein the received message is an SMS message, wherein the second message handling service is an e-mail service, wherein the second message type is e-mail, wherein the information element represents an e-mail Subject field and wherein the computer-executable instructions cause the computing device to generate the Subject element from a portion of a payload of the SMS message.

* * * * *